United States Patent [19]

Julien

[11] 3,922,371

[45] Nov. 25, 1975

[54] METHOD OF PREPARING AN ICE CONFECTION AND THE RESULTING PRODUCT

[76] Inventor: Neal B. Julien, 2929 N. 16th St., Phoenix, Ariz. 85016

[22] Filed: Feb. 25, 1974

[21] Appl. No.: 445,500

[52] U.S. Cl. ............................. 426/565; 426/599
[51] Int. Cl.² ............................................ A23G 9/00
[58] Field of Search ........... 426/164, 190, 206, 213, 426/380, 565, 599

[56] References Cited
UNITED STATES PATENTS

| | | | |
|---|---|---|---|
| 1,955,864 | 4/1934 | Stevens | 426/190 |
| 2,599,519 | 6/1952 | Stevens et al. | 426/190 |
| 2,863,776 | 12/1958 | Lisher | 426/190 |
| 3,114,641 | 12/1963 | Sperti et al. | 426/206 X |
| 3,227,562 | 1/1966 | Houghtaling et al. | 426/190 |
| 3,246,993 | 4/1966 | Webster et al. | 426/206 |
| 3,711,294 | 1/1973 | Atkins et al. | 426/190 X |

*Primary Examiner*—Raymond N. Jones
*Attorney, Agent, or Firm*—Warren F. B. Lindsley

[57] ABSTRACT

An improved composition of matter prepared by admixing and blending full strength fruit juice with sucrose, corn syrup solids, citric acid, stabilizer, coloring and water which is then mixed and formed into a frozen ice form and packaged in individual servings.

8 Claims, 2 Drawing Figures

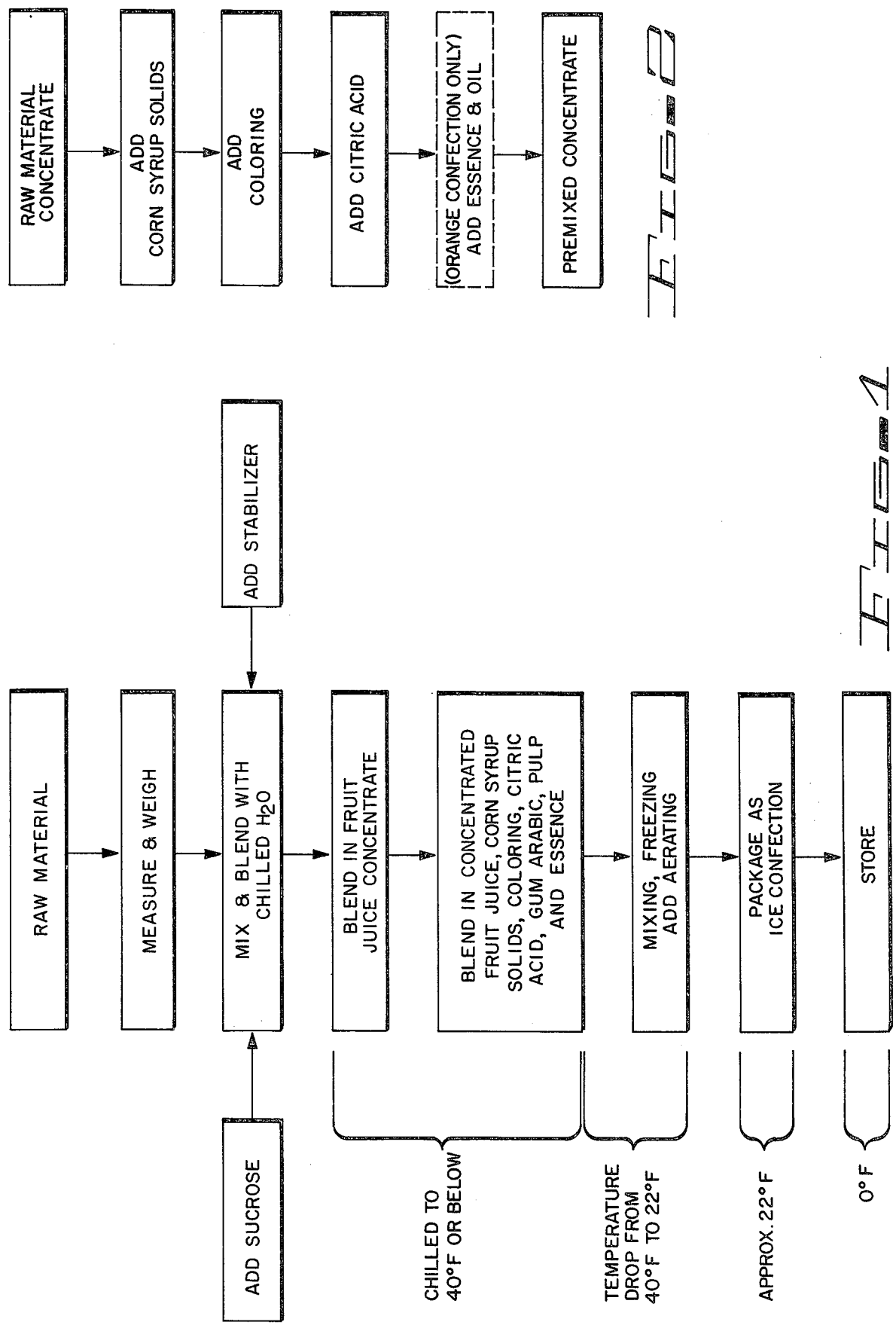

METHOD OF PREPARING AN ICE CONFECTION AND THE RESULTING PRODUCT

BACKGROUND OF THE INVENTION

This invention relates to novel, frozen ice products containing full strength fruit juice, sucrose, corn sugar, stabilizer and coloring and to a process for packing the same.

FIELD OF THE INVENTION

For many years, frozen desserts have been a pleasing treat useful in home lunches and dinners as well as in school lunch programs. However, orange juice as well as other fruit juices possessing certain highly desirable properties which make them an extremely valuable addition to any meal or lunch, have not been packaged in frozen form for eating directly since the process for doing so was unknown.

The frozen products of the prior art have been concentrations needing additional ingredients or have been frozen ice products colored and sweetened to resemble a given product such as orange juice without containing enough of the orange to be called full strength orange juice. Accordingly, a need exists for a frozen confection containing full strength orange juice which may be eaten directly without the addition of any ingredients and may be easily packaged such as in a pleated cup for ease in eating.

In order to meet the needs of the user a 2½ fluid ounce serving of such a frozen confection should contain 2 fluid ounces of a full strength food product such as orange juice in addition to the desired sucrose, corn sugar, stabilizer and coloring.

However, in spite of the widespread recognition of the desirability of using full strength food products such as orange juice in frozen food products for direct consumption, the freezing in an ice confection form has been a serious problem and has limited the use of frozen ice products to simulated food products, i.e., not the real products.

Prior to my invention it has been difficult to effectively utilize full strength orange juice and other fruit products in a frozen ice form for health and diet purposes. Most attempts have resulted in an ice product that lacked the food value necessary for U.S. Department of Agriculture approved school lunch programs.

Thus, a need exists for a frozen ice confection containing, for example, full strength orange juice and other food items for health, diet or lunch purposes which will maintain its food value over a long period of time in its frozen form and which can be handled, stored and utilized as other frozen ice cream, sherbert and related products when packaged for direct consumption by the user.

SUMMARY OF THE INVENTION

In accordance with the invention claimed, a new and improved composition of matter is provided which may be used to enrich foods with flavor and nutritional values or used in converting them to a frozen ice form containing a given full strength food product.

It is, therefore, one object of this invention to provide a new and improved frozen composition of matter utilizing, inter alia, full strength fruit juices.

Another object of this invention is to provide an improved food product for converting full strength orange juice into a freezeable ice product.

A further object of this invention is to provide a new and improved composition of matter in kit form for converting orange juice into a frozen ice confection.

A still further object of this invention is to provide a new method for the manufacture of a fruit juice into an ice product which may be easily controlled and regulated to attain uniform results under efficient methods of operation.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawing, in which:

FIG. 1 is a flow diagram for the manufacture of an ice confection and embodying the invention.

FIG. 2 is a flow diagram for manufacturing a mixture in kit form for use with a fruit juice product to manufacture the frozen confection.

DESCRIPTION OF THE PREFERRED EMBODIMENT

Referring more particularly to the drawing by characters of reference, FIG. 1 discloses a flow diagram showing the method or process of making new compositions of matter such as frozen ice confections embodying fruit juices in a full strength state. The method or process disclosed mixes the ingredients in a new way such that the raw materials, when mixed, have a coherency which facilitates freezing in an ice form, packaging and handling of fruit juices for direct consumption by the buying and using public. Coherence is influenced by moisture content, temperature and the particular ingredients mixed during the forming and packaging in an ice form. Many fruit juices are difficult to amalgamate into a single aerated ice body since by doing so reduces their cohesiveness thereby causing them to fall apart. Thus, the method of forming the product is extremely important. This is particularly true where orange juice is used in forming a full strength orange juice aerated ice product.

In accordance with the teachings of this invention with reference to forming a full strength orange juice product, one suitable mixing unit may comprise, as shown in FIG. 1, the mixing and blending of a suitable stabilizer such as, for example, 3.9 pounds of a commercial product called National Pectin NPL-136D Cold Water Soluble with approximately 87 pounds of a dry sucrose such as cane or beet sugar and approximately 50.5 gallons of chilled water. This agitated mixture is then mixed with approximately ten gallons of a suitable concentrated orange juice and chilled below 40°F. To this mixture is then blended in approximately five gallons of a novel mixture comprising approximately 2.5 gallons of an orange juice concentrate of approximately nine to one ratio of water to orange concentrate, i.e., the necessary water to render it a normal orange juice product which is used for adding pulp and essence, 18.5 pounds (approximately 2 gallons) of corn syrup solids and one-half gallon of a solution comprising citric acid, coloring, sodium citrate and gum arabic.

This added 5 gallons of ingredients may include as a portion thereof other flavor extracts and coloring, such as raspberry, grape, punch and the like. This mixture is mixed, aerated through a normal ice cream freezer where it is aerated to approximately 35 percent more air than a normal ice cream product and its temperature reduced from the freezer input temperature of about 40° to approximately 22°F and then packaged in pleated paper cups or in any other suitable package and frozen and maintained at approximately 0°F or lower. This product is then maintained suitably frozen until eaten. No pasteurization or homogenization is utilized.

It should be recognized that the above amounts of the ingredients are proportioned for a given unit of manufacture and should only be considered as approximate relative portions of the ingredients used and not restrictive limitations for manufacture.

What is disclosed herein is a blending of certain ingredients to arrive at an ice fruit juice product heretofore unavailable in the marketplace.

The following mix preparation has been found to be commercially acceptable.

TYPE I—INGREDIENTS

1. Thoroughly mix approximately 3.9 pounds of stabilizer (National Pectin NPL 136D Cold Water Soluble) with approximately 87 pounds of sugar and add to approximately 50.5 gallons of water under agitation.
2. Add 10 gallons of Coca Cola Company's "Sunfilled Number 1580 5+1 Orange Concentrate" or a concentrate of equivalent strength.
3. Add a mixture of concentrated orange juice, corn syrup solids, orange pulp, natural and artificial flavors, citric acid, artificial color, sodium citrate and gum arabic for a total with the above of approximately 72.5 gallons of finished product.
4. Aerate and chill to approximately 22°F until the desired consistency has been achieved and then package and store at 0°F or lower.

A 2½ fluid ounce serving of the above ice mixture will contain the following nutritional value:

| Food Energy | Protein | Fat | Carbohydrates | Calcium | Natural Vitamin C |
| --- | --- | --- | --- | --- | --- |
| 83 calories | 447 mg | 208 mg | 20 gm | 8.58 mg | 30 mg |

TYPE II—INGREDIENTS

The above ingredients of Type I may be varied by substituting for the orange juice ingredients imitation raspberry extracts and artificial red coloring; imitation punch extract and artificial red coloring; or imitation grape extract and artificial purple coloring if raspberry, punch or grape frozen ice products are desired.

FIG. 2 illustrates a new and novel composition of matter which comprises in concentrated form in approximately 5 gallon containers the ingredients necessary for mixing with commercial orange juice to form the claimed ice confection.

This new mixture comprises approximately 2½ gallons (approximately 26 pounds) of a 9 to 1 concentrate of an orange juice product (9 to 1 means nine parts of water to one part of an orange product comprising, inter alia, concentrated orange juice and pulp), approximately 2 gallons of corn syrup solids (approximately 18½ pounds), approximately 14½ ounces of coloring, approximately 3¼ ounces of citric acid and approximately 25 ounces of essences and oil.

If a raspberry ice product is to be manufactured, approximately 32 ounces of a red color and approximately 55 to 75 ounces of flavoring is used in lieu of the coloring and essences for the orange ice confection defined.

With a grape ice confection, approximately 30 ounces of a purple coloring and approximately 72.5 ounces of a grape flavoring is used in place of the raspberry ingredients identified above.

In manufacturing a punch ice confection, approximately 20 to 25 ounces of coloring and approximately 55 to 60 ounces of flavoring are used in lieu of the coloring and flavoring set forth above for the raspberry and grape ice confection defined.

It should be realized that the amount of coloring and flavoring used depends on the color and taste of the product desired. In all of the examples defined above, the orange juice is the main ingredient carrier even though raspberry, grape and punch products are manufactured.

It should also be recognized that the ice confection disclosed may be packaged in a pleated cup or on a stick as what has been known as a "pop sickle." However, a pleated cup has been found to be satisfactory. One suitable single serving cup has been found to be a 2½ fluid ounce container containing orange juice, sugar, corn syrup solids, cellulose and locust bean gums, orangs pulp, natural flavors, citric acid and artificial color derived from the methods disclosed above.

Although but a few embodiments of the present invention have been illustrated and described, it will be apparent to those skilled in the art that various changes and modifications may be made therein without departing from the spirit of the invention or from the scope of the appended claims.

What is claimed is:

1. The method of preparing an ice confection embodying full strength fruit juice comprising the steps of mixing first ingredients comprising a ratio of about 1 pound of pectin stabilizer with about 6 pounds of sucrose, agitating and blending said first ingredients with about 12 to 13 gallons of water, adding about 2½ gallons of a full strength fruit juice to said ingredients, chilling said ingredients at approximately 40°F, blending said ingredients with approximately 1¼ gallons of a second ingredient comprising a mixture containing approximately three quarters of a gallon of a fruit juice in a concentration ratio of approximately 9 to 1 of water to fruit juice, approximately three-eighths of a gallon of corn syrup solids and approximately one-eighth of a gallon of a mixture containing citric acid, sodium citrate and gum arabic, aerating said mixture to a desired consistency, freezing said mixture of said first and second ingredients to approximatley 20°F, and packaging and storing at 0°F or below.

2. The method of preparing an ice confection embodying full strength fruit juice comprising the steps of mixing first ingredients comprising about 3.9 pounds of a pectin stabilizer with about 87 pounds of dry sucrose, agitating and blending said first ingredients with about 50.5 gallons of water, adding about 10 gallons of a full strength fruit juice to said first ingredients, chilling said first ingredients at approximately 40°F or below, blending said first ingredients with approximately 5 gallons of a second ingredient comprising a mixture containing approximately 2½ gallons of a 9 to 1 concentrate of the fruit juice, approximately 2 gallons of corn syrup solids and approximately one-half gallon of a mixture containing citric acid, coloring, sodium citrate, and gum arabic, aerating and freezing said mixture of said first and second ingredients to about 20°F and then packaging and storing said confection at 0°F or below.

3. The method set forth in claim 2 wherein:
said fruit juice comprises orange juice.

4. The method set forth in claim 2 wherein:
said dry sucrose comprises sugar from the group consisting of beet or cane products.

5. The method set forth in claim 2 wherein:
the mixture is packaged in pleated cups having a capacity of approximately 2½ fluid ounces.

6. The method set forth in claim 2 wherein:
fruit juices from the group consisting of raspberry and grape are utilized.

7. The product produced by the method of claim 1.

8. The product produced by the method of claim 2.

* * * * *